(12) United States Patent
Chisnell

(10) Patent No.: US 7,249,787 B1
(45) Date of Patent: Jul. 31, 2007

(54) REINFORCEMENT FOR A HOSE COUPLING

(75) Inventor: Jerry H. Chisnell, Northville, MI (US)

(73) Assignee: Hutchinson FTS, Inc., Troy, MI (US)

( * ) Notice: Subject to any disclaimer, the term of this patent is extended or adjusted under 35 U.S.C. 154(b) by 0 days.

(21) Appl. No.: 09/393,482

(22) Filed: Sep. 10, 1999

(51) Int. Cl.
*F16L 33/00* (2006.01)

(52) U.S. Cl. .................. 285/256; 285/222.1; 285/258; 285/259; 29/507

(58) Field of Classification Search .............. 285/256, 285/259, 258, 222.1; 29/507, 508
See application file for complete search history.

(56) References Cited

U.S. PATENT DOCUMENTS

| 863,745 | A | | 8/1907 | Nelson et al. |
| 2,250,286 | A | | 7/1941 | White |
| 3,466,067 | A | * | 9/1969 | Orain |
| 5,044,671 | A | | 9/1991 | Chisnell et al. |
| 5,096,231 | A | | 3/1992 | Chisnell et al. |
| 5,387,016 | A | | 2/1995 | Joseph et al. |
| 5,775,740 | A | * | 7/1998 | Fukaya et al. |
| 5,988,704 | A | * | 11/1999 | Ryhman |

FOREIGN PATENT DOCUMENTS

RU 119043 * 1/1959 ............ 285/256

* cited by examiner

*Primary Examiner*—Brian E. Glessner
*Assistant Examiner*—Carlos Lugo
(74) *Attorney, Agent, or Firm*—VanOphem & VanOphem, PC

(57) ABSTRACT

A hose coupling using at least one reinforcing ring to reinforce a hose coupling during a crimping process, the hose coupling having an inner sleeve, an outer sleeve coaxial with the inner sleeve, and a hose coaxially interposed therebetween. During the crimping process a crimping force is applied directly to the outer sleeve to form at least one depression that results in an area of peak crimp force on the inner sleeve, the depression helping to seal and lock the hose between the inner and outer sleeves. The reinforcing ring is positioned within the inner sleeve and concentric with the area of peak crimp force on the inner sleeve. Consequently, the reinforcing ring prevents the inner sleeve from deforming under the crimping force, thereby ensuring the integrity and long-term durability of the hose coupling. The reinforcing ring preferably has an inside diameter equal to or greater than an inside diameter of the inner sleeve and is disposed within at least one groove located within the inner sleeve to permit unrestricted fluid flow through the hose coupling.

5 Claims, 2 Drawing Sheets

REINFORCEMENT FOR A HOSE COUPLING

BACKGROUND OF THE INVENTION

1. Field of the Invention

The present invention relates generally to conduit couplings. More particularly, the present invention relates to a compact reinforcement to be used in a crimped coupling for high-pressure hose connections such as in an automotive air-conditioning system.

2. Description of the Prior Art

It is generally known in the art relating to flexible conduit couplings to utilize a coupling member having a collar or concentric circular sleeves. The collar, or outer sleeve, is crimped over a hose circumscribing an inner sleeve in order to engage the hose to the coupling member and create a sealed coupling. Generally, to resist the crimping forces, the inner sleeve is made of heavy gauge steel. Unfortunately, heavy gauge steel adds unwanted cost and weight to the coupling assembly.

O-rings and split rings have been used in couplings for sealing and engaging a hose. For example U.S. Pat. Nos. 5,044,671 and 5,096,231 to Chisnell et al. disclose a hose fitting assembly having a resilient sealing member, such as an O-ring or nylon bushing, on the outer periphery of the inner sleeve that sealingly engages the hose to create a sealed coupling. While the sealing members provide a seal to prevent leaks, they do not add any structural benefit to the fitting, nor do they protect the inner coupling member from forces applied to crimp the coupling to the hose.

U.S. Pat. No. 2,250,286 to White discloses a coupling having two concentric circular sleeves. The outer sleeve has a protuberance that contains a split ring that engages the hose with the coupling member when the protuberance is depressed. The depression of the protuberance presses the split ring against the material of the hose and thereby holds the hose firmly between the two sleeves of the coupling. The hose coupling is designed to compress and deform in order to securely engage the hose between the split ring and the inner sleeve of the coupling. Therefore, coupling and use of the split ring to enhance sealing does not in any way prevent the inner sleeve of the coupling from deformation in case of an excessive crimping force.

U.S. Pat. No. 863,745 to Nelson et al. discloses a metal strengthening ring concentrically located between a rubber inner portion and fabric outer portion of a hose. The strengthening ring strengthens an enlarged head portion of the fabric outer portion of the hose, and the coupling is not necessarily crimped at the point where the strengthening ring is located. The placement of the ring prevents expansion of the inner rubber portion of the hose over the strengthening ring and compression of the rubber hose between the ring and the coupling sleeve, that causes damage to the hose and speeds deterioration and failure of the hose and coupling connection. Therefore, the strengthening ring may reinforce the hose, but does not necessarily protect the inner sleeve of the coupling from excessive crimping forces.

More recently, there have been attempts to produce couplings from lightweight materials such as aluminum. However, because of the crimping force necessary to secure the hose to the coupling, reinforcement is required to prevent the weaker aluminum coupling from deforming. Accordingly, U.S. Pat. No. 5,387,016 to Joseph et al. discloses such a tubular coupling fabricated from aluminum that includes a tubular liner having a predetermined length that is press-fit into the tubular connector body. The tubular liner provides structural rigidity and strength to the aluminum connector thereby protecting the coupling from deforming under the crimping force required to connect the tubular connector body to the end of the rubber hose.

Furthermore, Joseph et al. discloses that the tubular liner is formed from a different material than the material of the coupling body to increase the structural rigidity of the body. Therefore, the benefit of using lightweight aluminum for the connector body is countered by the burden of the added weight of the tubular liner. In other words, while the tubular liner of Joseph et al. may add strength, it also adds significantly more weight and cost.

Another problem with the relatively long tubular insert of Joseph et al. is one of beam deflection. Under radial compression, the relatively long tubular liner is weaker and more prone to deflection than a more discrete element of the same cross section would be. That is, when the crimping force is applied to the coupling, the relatively long tubular liner will have a tendency to compress relatively easily because of cumulative deflection along the length of the tubular liner. A more discrete element would undergo relatively minute beam deflection.

Additionally, in an automotive air-conditioning system, the flow of fluid, such as refrigerant fluid, should not be disrupted or it may adversely affect the operation of the air-conditioning system. Accordingly, a disadvantage of the tubular liner disclosed by Joseph et al. is that the reduced inner diameter of the coupling over the entire length of the tubular liner results in a significantly restricted flow of fluid through the coupling.

Further, in a vehicle's air-conditioning system, hose couplings are exposed to a harsh environment where the hose couplings are damaged due to heat and vibrations generated by the vehicle's engine. The harsh engine environment coupled with increased pressure on the hose couplings at the deformed crimped connections has been known to cause prior art couplings to fail prematurely. A discrete reinforcement member in the coupling can provide reinforcement that helps the coupling to overcome the above mentioned shortcomings of the prior art.

Finally, prior art crimped couplings for steel and aluminum couplings have been tested by the applicant of the present invention. Throughout a variety of tests and observation of failed components, it has been concluded that when the crimped connection fails, it fails repeatedly in the same location, independent of whether a steel coupling, an aluminum coupling, or an aluminum coupling with a tubular liner is used. Accordingly, there continues to be a need for a lower cost, lighter weight reinforcement for a hose coupling that will provide support necessary to withstand crimping forces on the tubular body. Finally, the solution must be cost effective, lighter in weight, and not restrict fluid flow through the hose coupling.

SUMMARY OF INVENTION

According to the present invention, at least one reinforcing ring is strategically placed within a hose coupling for reinforcement. The hose coupling has an inner sleeve, an outer sleeve coaxial with the inner sleeve, and a hose coaxially inserted therebetween. The outer sleeve has at least one depression while the inner sleeve has at least one projection for axially locking the hose between the inner and outer sleeves. The depression is formed by a crimping method that ordinarily would narrow or collapse the inner sleeve. However, a reinforcing ring is positioned within the inner sleeve concentric to an area of peak crimp force exerted by the crimping method. Preferably, the reinforcing ring is positioned within a groove within the inner sleeve and has an inner diameter equal to or greater than an inner diameter of the inner sleeve, to permit unrestricted fluid flow through the full cross section of the inner diameter of the inner sleeve.

By analyzing failed couplings, where the inner sleeve has collapsed from crimp forces, the applicant can predict the exact area of the inner sleeve that will fail for each individual design. Accordingly, the reinforcing ring is strategically located concentric with the predicted area of failure to reinforce the inner sleeve during the crimping operation. The reinforcing ring resists the peak pressure from the crimping force and thus prevents damage to the inner sleeve from occurring, thereby improving the integrity and long-term durability of the hose coupling.

Prior art reinforcements are longer than necessary and therefore undergo beam deflection during the crimping operation. The reinforcing ring of the present invention provides more rigid reinforcement because it is discrete—strategically located only where absolutely necessary—and thereby undergoes virtually no beam deflection. Additionally, the reinforcing ring is smaller and lighter than prior art reinforcements and accordingly will be less expensive.

Accordingly, it is an object of the present invention to protect the inner sleeve of a tubular coupling from deforming under the pressure of the crimp force.

It is another object of the present invention to reinforce the area of peak crimp force of the tubular coupling during the crimping process to ensure integrity and long-term durability of the coupling.

It is yet another object of the present invention to provide a more rigid, lower cost, and lighter weight tubular coupling than is presently known in the art.

It is a further object of the present invention to provide a tubular coupling having an outer sleeve that is crimped, an inner sleeve, and at least one reinforcing ring inside the inner sleeve located in the same plane as the area of peak crimp force of the coupling so as to increase the overall life of the crimped connection.

It is yet a further object of the present invention to provide unrestricted flow through the coupling.

For a better understanding of the features and advantages of the present invention, attention is directed to the following brief description of the drawings taken in conjunction with the detailed description of the preferred embodiment of the invention and the appended claims.

DETAILED DESCRIPTION OF THE PREFERRED EMBODIMENT

Figure 1:
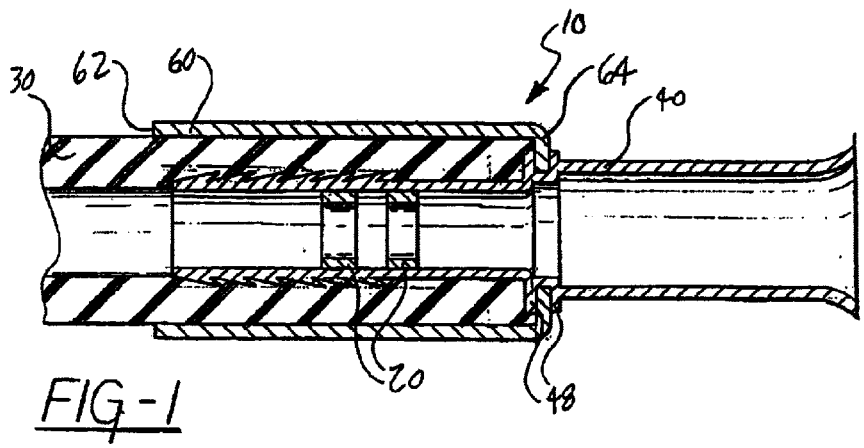
FIG. 1 is a cross sectional view of a hose coupling and reinforcing ring of the present invention.
Figure 2:
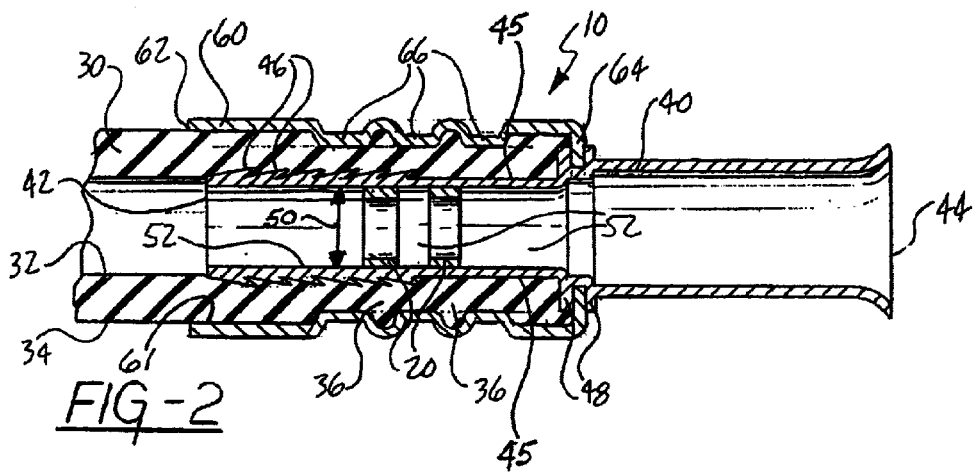
FIG. 2 is a cross sectional view of the hose coupling and reinforcing ring of the present invention with a hose crimped thereto.
Figure 4:
FIG. 4 is a perspective view of the reinforcing ring of the hose coupling of the present invention.

Referring to the Figures, particularly to FIGS. 1 and 2, there is shown a coupling 10 having at least one reinforcing ring 20 mounted therein according to the present invention. The reinforcing ring 20 is shown in perspective in FIG. 4. The coupling 10 connects a hose 30 to a cylindrical inner body or inner sleeve 40. The inner sleeve 40 may in turn be connected to other components of an air-conditioning system. The coupling 10 is generally used in automotive air-conditioning systems for transporting refrigerant fluid. However, the present invention may be used in any application for a connection requiring characteristics similar to those described herein.

Referring now to FIG. 2, the inner sleeve 40 has a first end 42 over which the hose 30 is mounted and a second end 44 that is a termination point or acts to engage other components of the air-conditioning system. An outer diameter 45 of the inner sleeve 40 has outward projections or serrations 46 that engage and seal against an inner diameter 32 of the hose 30.

Figure 3:
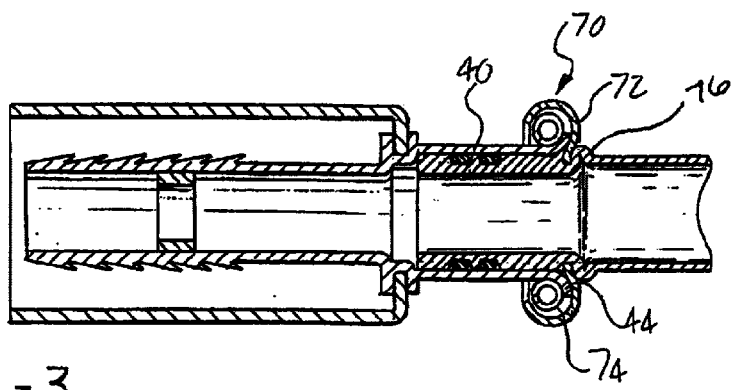
FIG. 3 is a cross sectional view of a hose assembly utilizing a quick-connect coupling and the hose coupling of the present invention.

As shown in FIG. 3, the second end 44 of the inner sleeve 40 is characteristic of a variety of connectors. An example of one type of connector is a quick-connect tubular coupling 70 presently known in the art and described in U.S. Pat. No. 4,055,359 to McWethy. The quick-connect tubular coupling 70 illustrated in FIG. 3 requires that the second end 44 of the inner sleeve 40 be flared. The quick-connect tubular coupling 70 includes an annular cage 72 that is axially retained by an annular upset bead 76 and receives the second end 44 of the inner sleeve 40 of the coupling 10. A coil spring 74 is located between the flared second end 44 of the inner sleeve 40 and the annular cage 72. The second end 44 of the inner sleeve 40 is retained between the annular cage 72 and the coil spring 74 of the quick-connect tubular coupling 70. Slight modifications to the second end 44 of the inner sleeve 40 are easily made by one skilled in the art and permit the inner sleeve 40 to be compatible with other tubular connectors.

Referring again to FIGS. 1 and 2, according to the present invention the coupling 10 has an outer sleeve 60 coaxially aligned with and greater in diameter than the inner sleeve 40. The outer sleeve 60 has an open end 62 that mounts over the hose 30 and further has a connection end 64 for connecting to the inner sleeve 40. The connection end 64 of the outer sleeve 60 is axially retained on the inner sleeve 40 by annular upset beads 48 that are formed in the inner sleeve 40. The annular upset beads 48 sandwich the connection end 64 of the outer sleeve 60 preventing axial movement of the outer sleeve 60 relative to the inner sleeve 40.

As shown in FIG. 2, the hose 30 is assembled to the coupling 10 by inserting the hose 30 between the inner sleeve 40 and the outer sleeve 60. The outer sleeve 60 has an inner diameter 61 that surrounds an outer diameter 34 of the hose 30. The outward projections 46 on the inner sleeve 40 engage the inner diameter 32 of the hose 30 when the outer sleeve 60 is crimped, using a known method, over the outer diameter 34 of the hose 30 to retain the hose 30 to the coupling 10.

The crimping method collapses the outer sleeve 60 and likewise collapses the hose 30 and flows hose material longitudinally outward, thereby forming at least one depression 66 in the outer sleeve 60. Accordingly, the hose 30 is spaced relative to the rest of the coupling 10 to permit free longitudinal flow of the hose material during crimping. Consequently, the hose material is axially retained by the depression 66 and the outward outward projections 46 to prevent axial or longitudinal movement relative to the coupling 10 and inner sleeve 40.

Further, the crimping method also creates an area of peak crimp force 36 that ordinarily results in narrowing or collapsing of the inner sleeve 40. Applicant asserts that the magnitude and area of peak crimp force 36 can be empirically predetermined and is different for each coupling design. The corresponding reinforcing ring 20 is then designed and strategically placed inside the inner sleeve 40 concentric with the predetermined area of peak crimp force 36. Here, the reinforcing ring 20 acts to resist the collapsing force of the crimping method in order to maintain the full cross section of the inner sleeve 40. Further, the narrowing or collapsing of the inner sleeve 40 results in an unpredictable restriction of fluid flow. In contrast, restriction in fluid flow due to the smaller diameter reinforcing ring 20 is easily calculated and designed around.

Furthermore, it has been disclosed that a more discrete reinforcing ring 20 is all that is required, rather than a long reinforcing tube as with the prior art. However, it is also preferable to use more than one reinforcing ring 20 where necessary to achieve support in non-contiguous crimping areas while maintaining the significant cost and weight savings over the prior art.

According to the preferred embodiment, the reinforcing ring 20 is made of a rigid material, such as steel, but may be made of any other suitable material such as nylon or plastic. The width of the reinforcing ring 20 is only that that is necessary to support the inner sleeve 40 concentric with the area of peak crimp force 36. The reinforcing ring 20 is as discrete as possible and is therefore not subject to beam deflection as are reinforcements of the prior art.

Still referring to FIG. 2, the outer diameter of the reinforcing ring 20 is slightly larger than the inner diameter 50 of the inner sleeve 40. The reinforcing ring 20 is press fit into the inner diameter 50 of the inner sleeve 40. The press-fit may be controlled by a stop on a mandrel press (not shown), to ensure the reinforcing ring 20 is properly located within the inner sleeve 40.

Figure 5:
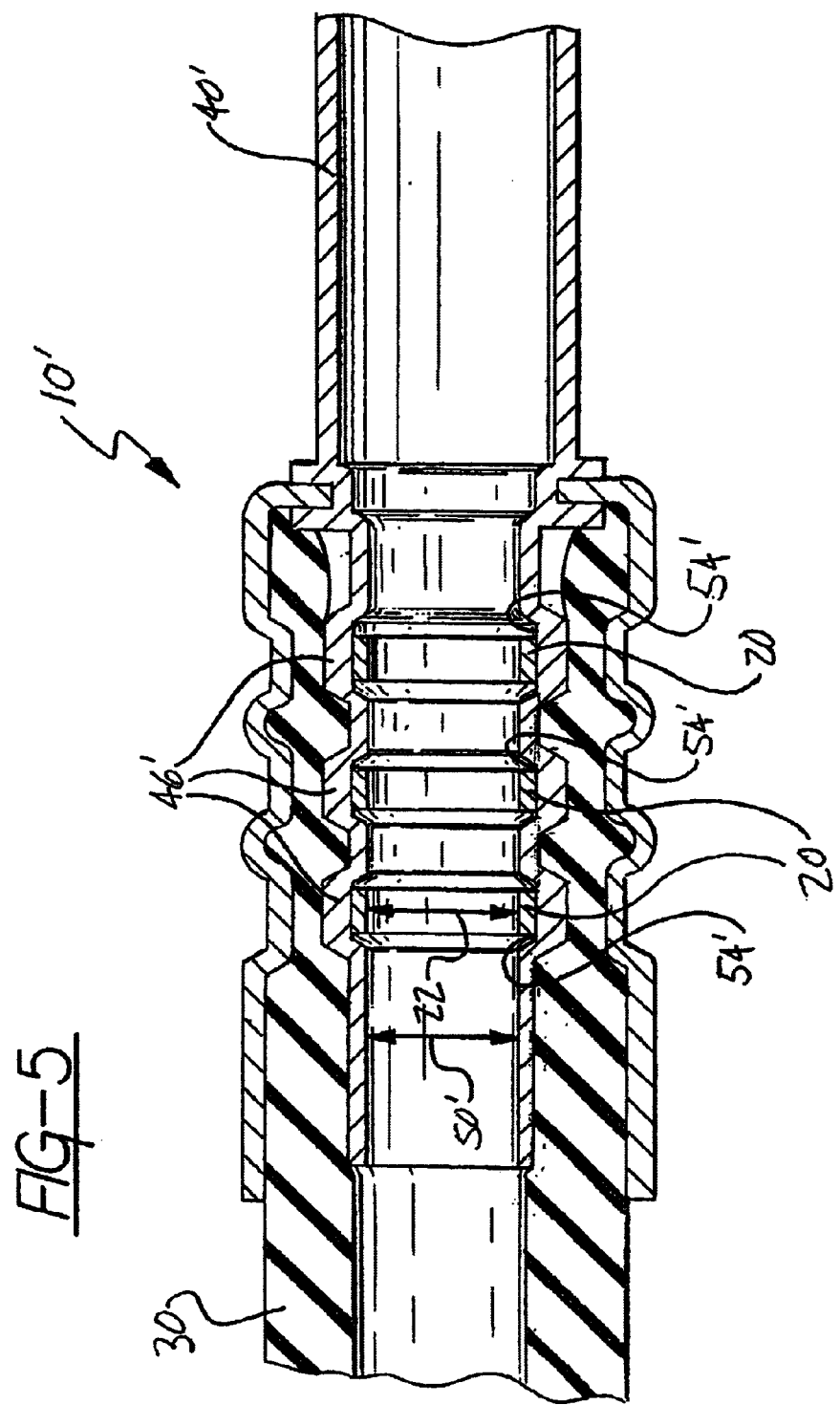
FIG. 5 is a cross sectional view of a coupling according to the preferred embodiment of the present invention.

FIG. 5 shows the preferred embodiment of the present invention that permits unrestricted fluid flow through the hose coupling 10'. An inner sleeve 40' has at least one formed projection 46' for interlocking with the hose 30 and housing the reinforcing ring 20. Here, the reinforcing ring 20 is positioned within a groove 54' in an inner diameter 50' of the inner sleeve 40' and has an inner diameter 22 equal to or greater than the inner diameter 50' of the inner sleeve 40' to permit unrestricted fluid flow through the full cross section of the inner diameter 50' of the inner sleeve 40'.

Preferably, the inner sleeve 40' is formed with the reinforcing ring 20 intact prior to final assembly of the hose coupling 10'. Here, the reinforcing ring 20 is larger in diameter than the inner diameter 50' of the inner sleeve 40'. Thus, the reinforcing ring 20 is press fit into the inner sleeve 40' to a predetermined location, then the inner sleeve 40' is collapsed inwardly around the reinforcing ring 20.

In conclusion, the combination of the coupling and reinforcing ring of the present invention serve to protect the inner sleeve of the coupling from deforming under the pressure of the crimp force. The reinforcing ring also provides concentrated reinforcement in the area of peak crimp force of the crimped connection to prolong the life of the coupling. Because the reinforcing ring of the present invention is localized, its size is small and associated weight is negligible, whereby the reinforcing ring according to the present invention is capable of providing cost and weight savings over tubular couplings presently known in the art, while improving the durability of crimped connections.

Further, because the reinforcing ring concentrates support in a specific area, it provides more concentrated support than a much longer reinforcement, due to cumulative beam deflection in the longer reinforcement. A longer reinforcement, such as those provided in the prior art, decreases the reinforcement in localized areas where it is needed and unnecessarily reinforces areas that do not require reinforcement, adding unnecessary weight and cost to the coupling. In contrast, an advantage of the small width of the reinforcing ring of the present invention is that it minimizes or eliminates the disruption of the flow of fluid through the hose coupling compared to the reinforcements of prior art coupling connections.

It will be apparent to one skilled in the art that modifications may be made to the preferred embodiment without departing from the following claims.

What is claimed is:

1. A hose coupling having an area of peak crimp force, said hose coupling comprising:

an inner sleeve having a first end, a second end opposite said first end, and a pair of annular upset beads therebetween, said inner sleeve further having an inner diameter and an outer diameter thereon, said inner diameter having at least one groove therein, said outer diameter having at least one projection thereon;

a hose having an inner diameter positioned over said outer diameter of said inner sleeve, wherein said at least one projection of said inner sleeve interlocks with said hose to resist axial movement of said hose relative to said hose coupling;

an outer sleeve having a terminating end sandwiched between said pair of annular upset beads of said inner sleeve, said outer sleeve further having an inner diameter circumscribing said hose, said inner diameter of said outer sleeve further having at least one depression formed by a crimping operation, said at least one depression being concentric with said at least one groove of said inner sleeve, wherein said at least one depression interlocks with said hose to further resist axial movement of said hose relative to said hose coupling; and a reinforcing ring positioned within said at least one groove in said inner diameter of said inner sleeve and concentric with said area of peak crimp force, whereby said reinforcing ring resists deformation of said inner sleeve during said crimping operation, said reinforcing ring having an inner diameter at least as great as said inner diameter of said inner sleeve, whereby said reinforcing ring permits full cross sectional fluid flow through said hose coupling.

2. The hose coupling according to claim 1, wherein said second end of said inner sleeve is flared.

3. The hose coupling according to claim 2, wherein said second end of said inner sleeve is received within a second coupling, said second coupling comprising:

a tubular body having an annular upset bead; a cage received within and retained by said annular upset bead; and a spring disposed within said cage, said second end of said inner sleeve being retained between said cage and said spring of said second coupling.

4. The hose coupling according to claim 1, wherein said reinforcing ring is made of a rigid material.

5. The hose coupling according to claim 4, wherein said reinforcing ring is made of steel.

* * * * *